UNITED STATES PATENT OFFICE 2,415,255

SULFOSUCCINATE ESTERS OF 3,5-ALKYLCYCLOHEXANOLS

Kathryn L. Lynch, Stamford, Conn., assignor to American Cyanamid Company, New York, N. Y., a corporation of Maine No Drawing. Application September 1, 1945, Serial No. 614,089

2 Claims. (Cl. 260—481)

This invention relates to surface-active compounds and their methods of preparation, and more particularly to sulfosuccinate esters of alcohols of the cycloaliphatic series. A principal object of the invention is to provide new sulfosuccinate esters of this series having good wetting, detergent and anti-fogging properties.

Although the di-alkyl sulfosuccinates prepared from aliphatic alcohols of 6–8 carbon atoms are known to be among the most powerful wetting agents in existence, the corresponding di-cyclohexyl esters are relatively poor in their wetting power. Thus, for example, di-cyclohexyl sodium sulfosuccinate has only about 15% of the wetting power of di-(methylamyl) sodium sulfosuccinate, which is sold commercially as "Aerosol MA." Similarly, di-2-methylcyclohexyl sodium sulfosuccinate has only about 20–25% of the wetting power of the corresponding aliphatic diheptyl ester.

It is therefore quite surprising to find, as I have found, that the diesters of sulfosuccinic acid with 3,5-dimethylcyclohexanol and with 3,3,5-trimethylcyclohexanol possess very good wetting power. The sodium salt of the 3,5-dimethylcyclohexyl ester has about 10 times the wetting power of di-2-methylcyclohexyl sodium sulfosuccinate and the 3,3,5-trimethylcyclohexyl ester has about 17 times the wetting power of the same compound. This discovery is of considerable commercial importance, for the cycloaliphatic alcohols are readily prepared by hydrogenation of the corresponding phenols, which are available in large quantities, and therefore a new source of raw materials for the preparation of highly active wetting agents is opened up by the present invention.

The compounds of my invention are therefore those having the following structural formula:

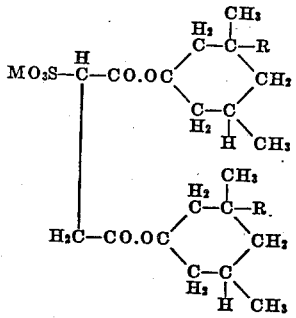

in which M is a salt-forming radical such as sodium, potassium, ammonium, ethanolamine, etc., and R is either hydrogen or a methyl radical. These compounds are preferably prepared by esterifying maleic anhydride or maleic or fumaric acid with the corresponding alcohol, as illustrated in the following examples, followed by sulfonation of the maleic or fumaric acid ester to form the sulfosuccinate. Preferably the sulfonation is carried out by heating the ester with an aqueous solution of sodium bisulfite or sodium metabisulfite, or of the corresponding potassium or ammonium compound, whereby the water-soluble salts of the sulfosuccinate esters are obtained directly. These salts can be converted into the free sulfonic acid by dissolving them in ethanol and treating with sulfuric acid, and the resulting free sulfonic acid can be transformed into salts of other bases such as triethanolamine or heavy metals by simple admixture therewith.

The invention will be further illustrated by the following specific examples.

Example 1

A quantity of 3,5-dimethylcyclohexanol was prepared by hydrogenating symmetrical xylenol under 1,500 lbs./sq. in. hydrogen pressure at temperatures up to 200° C. during 2 hours, using a Raney nickel catalyst.

110 parts by weight of the hydrogenation product was mixed with 38 parts of maleic anhydride in 80 parts of toluene containing 1.5 parts of p-toluenesulfonic acid and the mixture was agitated at 132° C. for 4.5 hours while removing the water of esterification. The mixture was washed with dilute NaOH solution and then with water and the solvent and excess alcohol removed by distillation at reduced pressure.

The resulting di-3,5-dimethylcyclohexylmaleate was sulfonated by refluxing with agitation in the presence of 30 parts of sodium bisulfite dissolved in a mixture of 80 parts of ethyl alcohol and 25 parts of water for 8.5 hours followed by extraction with ether to remove any unsulfonated ester. The aqueous solution was then evaporated, yielding a brittle white water-soluble solid. Analysis gave the following:

|  | Saponification No. | Sulfur | Sulfated ash |
|---|---|---|---|
|  |  | Per cent | Per cent |
| Obtained | 258.6 | 6.90 | 16.0 |
| Theory | 255 | 7.27 | 16.15 |

Calculated purity about 95%.

Example 2

Using the procedure of Example 1 di-(3,3,5-trimethylcyclohexyl) sodium sulfosuccinate was prepared from 340 parts of 3,3,5-trimethylcyclohexanol, 98 parts of maleic anhydride and 103 parts of sodium bisulfite, the sulfonation period being 9 hours. The product was obtained as a brittle white solid which readily ground to a fine white powder soluble in water to clear solutions having a pH of 7.0. The analysis was as follows:

|  | Saponification No. | Sulfur | Sulfated ash |
|---|---|---|---|
|  |  | Per cent | Per cent |
| Obtained | 246 | 7.03 | 16.7 |
| Theory | 239 | 6.84 | 15.2 |

Example 3

The wetting power of the products of Examples 1 and 2 was determined by the Draves test at 30° C. The sinking time in seconds of a standard skein at various concentrations of the wetting agent is given in the following table:

|  | Conc. in grams per liter ||||||| 
|---|---|---|---|---|---|---|---|
|  | 0.75 | 0.6 | 0.5 | 0.4 | 0.3 | 0.25 | 0.15 |
| Example 1 | 7 |  | 19.5 | 30 | 54 | 81 |  |
| Example 2 |  | 11.2 | 14.5 | 18 | 28 | 31 | 63 |

Both compounds are powerful wetting agents, but the product of Example 2 has about 1.5 times the wetting power of that of Example 1.

What I claim is:
1. A compound of the formula

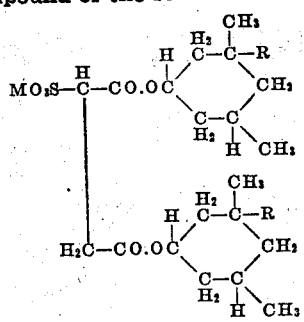

in which M is a member of the group consisting of sodium, potassium and ammonium and R is a member of the group consisting of hydrogen and methyl radicals.

2. A compound of the formula

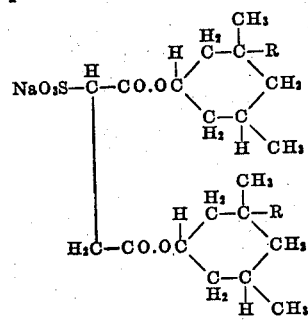

in which R is a member of the group consisting of hydrogen and methyl radicals.

KATHRYN L. LYNCH.

REFERENCES CITED

The following references are of record in the file of this patent:

UNITED STATES PATENTS

| Number | Name | Date |
|---|---|---|
| 2,176,423 | Jaeger | Oct. 17, 1939 |
| 2,028,091 | Jaeger | Jan. 14, 1936 |